(12) United States Patent
Sturm et al.

(10) Patent No.: US 7,725,629 B2
(45) Date of Patent: May 25, 2010

(54) PROCESSOR ARRAY ARRANGEMENT CONTROLLED BY CONTROL COMPUTER

(75) Inventors: Thomas Sturm, Kirchheim (DE); Rupert Glaser, Woerth (DE); Christl Lauterbach, Hoehenkirchen-Siegertsbrunn (DE); Annelie Sohr, Munich (DE); Werner Weber, Munich (DE); Frank Schliep, Leverkusen (DE)

(73) Assignee: Infineon Technologies AG, Neubiberg (DE)

( * ) Notice: Subject to any disclaimer, the term of this patent is extended or adjusted under 35 U.S.C. 154(b) by 521 days.

(21) Appl. No.: 11/554,693

(22) Filed: Oct. 31, 2006

(65) Prior Publication Data

US 2007/0150071 A1 Jun. 28, 2007

(30) Foreign Application Priority Data

Oct. 31, 2005 (DE) ...................... 10 2005 052 005

(51) Int. Cl.
*G06F 13/12* (2006.01)
*G06F 15/00* (2006.01)
*G06F 13/00* (2006.01)

(52) U.S. Cl. .............................. 710/72; 712/1; 711/100
(58) Field of Classification Search ........................ None
See application file for complete search history.

(56) References Cited

U.S. PATENT DOCUMENTS

| | | | |
|---|---|---|---|
| 5,878,241 A * | 3/1999 | Wilkinson et al. | 712/203 |
| 6,275,920 B1 * | 8/2001 | Abercrombie et al. | 712/14 |
| 2005/0078115 A1 | 4/2005 | Buchmeier et al. | |
| 2006/0241878 A1 | 10/2006 | Jung et al. | |
| 2007/0150071 A1 * | 6/2007 | Sturm et al. | 700/1 |

FOREIGN PATENT DOCUMENTS

| | | |
|---|---|---|
| DE | 101 58 784 A1 | 8/2003 |
| DE | 101 58 781 A1 | 5/2004 |
| DE | 103 37 940 | 7/2004 |
| DE | 103 35 819 A1 | 3/2005 |
| DE | 103 44 285 A1 | 5/2005 |
| GB | 2 324 373 A | 10/1998 |
| WO | WO-2004/076731 A1 | 9/2004 |
| WO | WO-2005/015427 A1 | 2/2005 |
| WO | WO-2005/031550 A1 | 4/2005 |

OTHER PUBLICATIONS

Sturm, T., et al.; "A Novel Fault-Tolerant Architecture for Self-Organizing Display and Sensor Arrays"; SID Symposium Tech. Dig., vol. XXXIII, No. II, pp. 1316-1319, 2002.

(Continued)

*Primary Examiner*—Alan Chen
(74) *Attorney, Agent, or Firm*—Dickstein, Shapiro, LLP.

(57) ABSTRACT

A processor arrangement having a plurality of processor units and a control computer. Each of the processor units is connected to at least one adjacent processor unit and has one control element and at least one communications interface for providing a data communications link with an adjacent processor unit. The control computer is connected to one of the processor units, and is configured for exchanging information with the processor unit and for assigning one control element of the plurality of control elements to a device that is electrically connected to the processor arrangement for the control of the device.

20 Claims, 6 Drawing Sheets

OTHER PUBLICATIONS

Jung, S., et al.; "Applications of Microelectronics and Sensors in Intelligent Textile Fabrics"; TechTextil Symposium, Frankfurt a.M., Germany, Apr. 2003.

Weber, W., et al.; "Electronics in Textiles—The Next Stage in Man Machine Interaction"; Proc. of the 2$^{nd}$ CREST Workshop in advanced communicating techniques for wearable information playing, pp. 35-41, Nara, Japan, May 2003.

State Intellectual Propery Office, P.R. China, Chinese Second Office Action (to corresponding Chinese Application No. 200610164719.4) dated Feb. 20, 2009 and English translation of same.

* cited by examiner

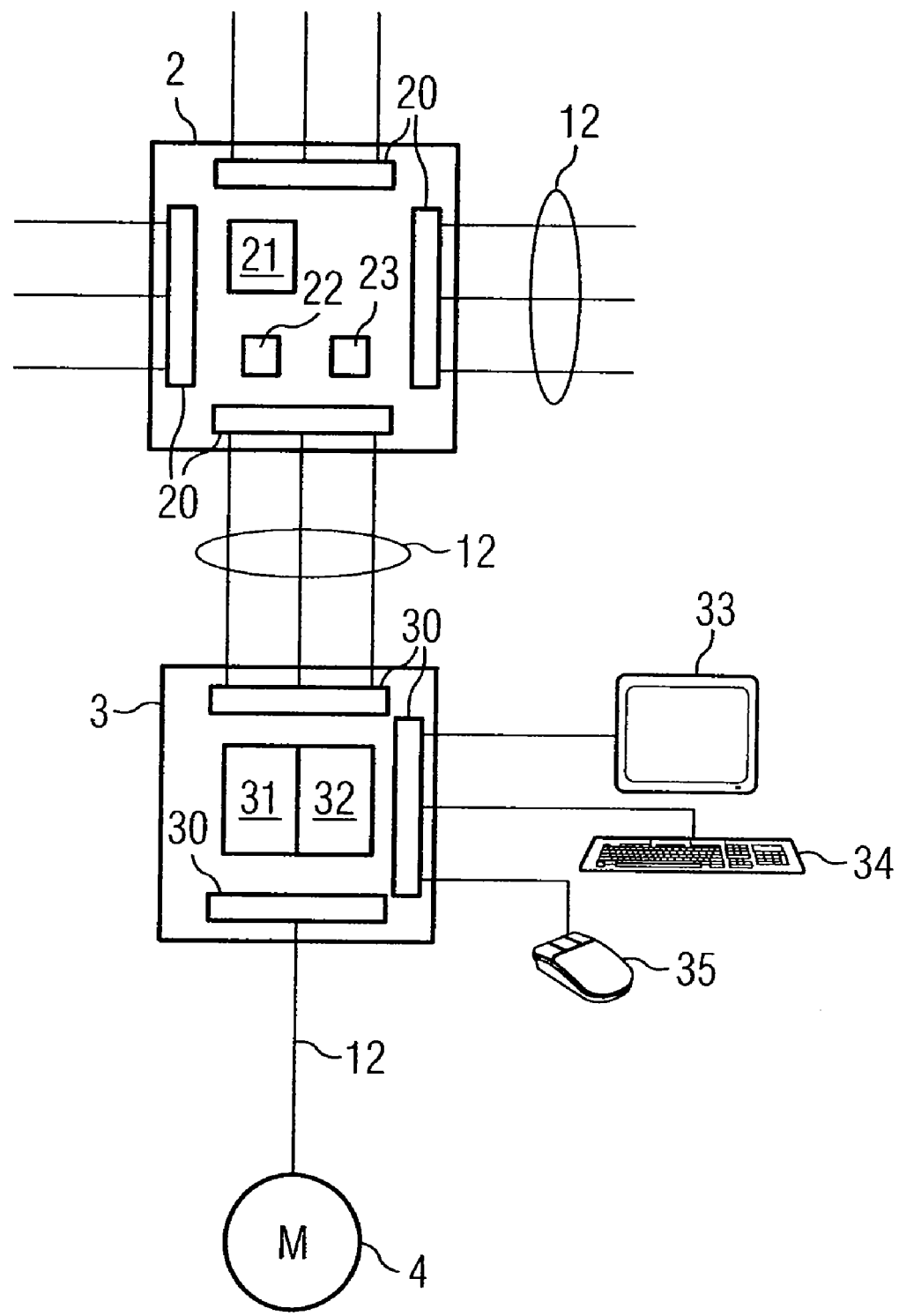

PROCESSOR ARRAY ARRANGEMENT CONTROLLED BY CONTROL COMPUTER

CROSS-REFERENCE TO RELATED APPLICATION

This application claims priority to German Patent Application Serial No. 10 2005 052 005.7-55, which was filed on Oct. 31, 2005, and is incorporated herein by reference in its entirety.

BACKGROUND OF THE INVENTION

The invention relates to a processor arrangement.

It is desirable to realize control functions flexibly at variable locations so that it is possible to operate electrical devices using the control functions arranged at these locations.

SUMMARY OF THE INVENTION

A processor arrangement having a plurality of processor units and a control computer. Each of the processor units is connected to at least one adjacent processor unit and has one control element and at least one communications interface for providing a data communications link with an adjacent processor unit. The control computer is connected to one of the processor units, and is configured for exchanging information with the processor unit and for assigning one control element of the plurality of control elements to a device that is electrically connected to the processor arrangement for the control of the device.

BRIEF DESCRIPTION OF THE FIGURES

Exemplary embodiments of the invention are represented in the figures and are described in greater detail below. The figures described serve only to explain the invention and in particular do not represent accurate scale drawings of the subject-matter of the invention. In all figures, the same reference numerals are used to denote the same elements in the figures where applicable.

FIG. 6 shows a processor unit and the control computer in detail.

DETAILED DESCRIPTION OF THE INVENTION

Figure 1:
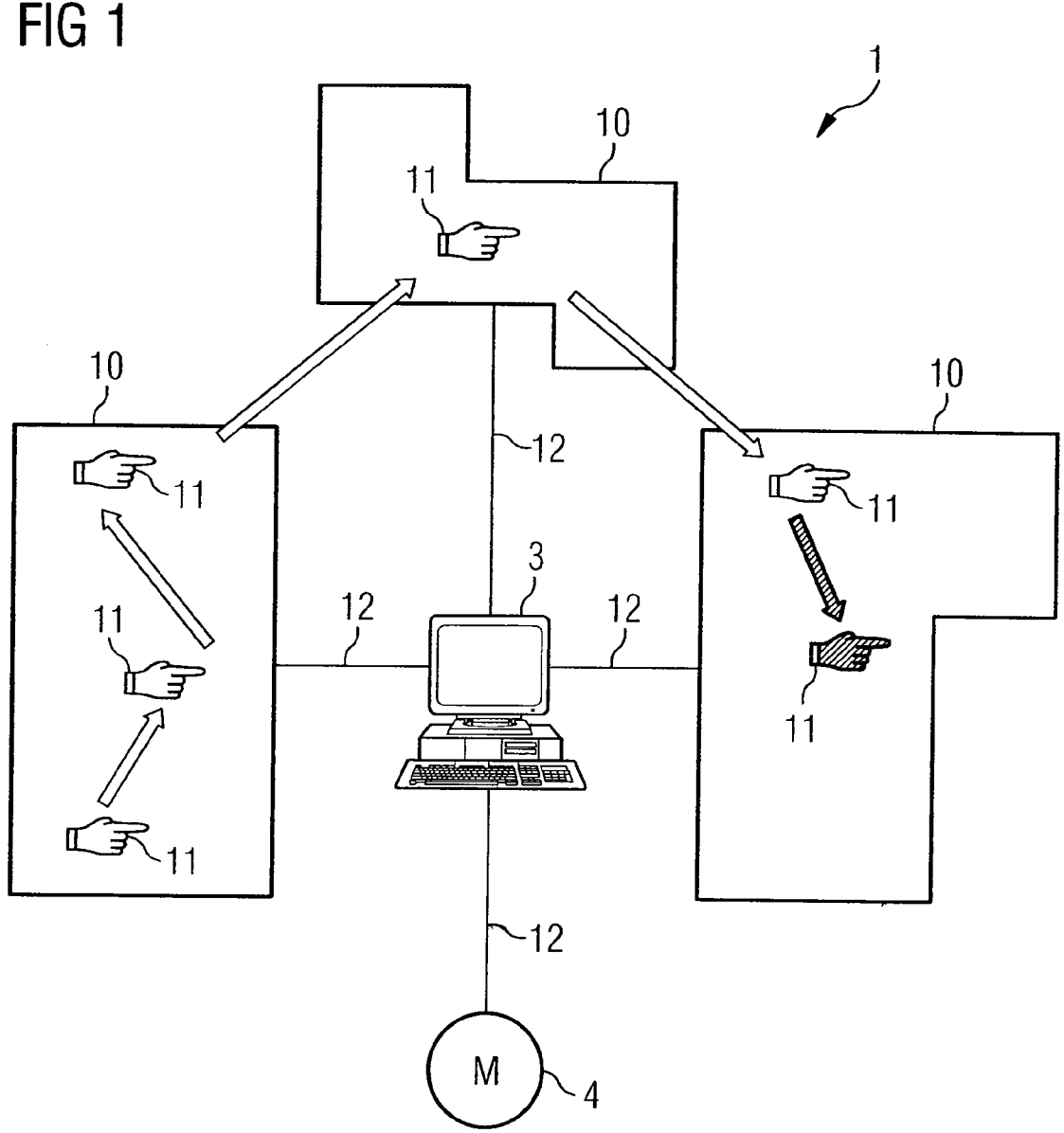
FIG. 1 shows an exemplary embodiment of the invention.

Control elements for controlling technical devices are usually situated at fixed positions. Examples include, say, the window raising switch, the seat adjustment or the speed display in a vehicle, controllers for appliances in a domestic environment, and control consoles in industrial manufacturing.

If another user uses these control elements, for example following a change of driver in a vehicle, or if the operating requirements change, for example following the reconfiguration of a production system, then it is frequently desirable to be able to alter the position of the control elements.

In order to solve this problem, to date the following approaches have been adopted for example:

Dispensing with the transfer of control and display functions: In this case, at best the user must do without some convenient functionality. In an office or production environment, however, this also leads to a reduction in productivity, as the user needs to find the location of the control and display functions in order to use them or read them. In a vehicle, this might necessitate a change in the position or inclination of the seat while in a production hall it might necessitate a walk of several meters.

Physical mobility of the control and display functions:

In some cases a practicable solution is to house the control and display functions in a mobile device which communicates wirelessly or via a wired connection with the technical devices. Examples include infrared remote operation of media appliances (television, stereo system), Bluetooth communication between a PDA (personal digital assistant) and a printer controlled by the PDA, or a laptop for the cable-connected diagnosis of malfunctions in an automobile. The disadvantages of this solution, however, are the high costs for such a type of remote control, the risk of losing such a control device, typically the exclusivity of control (i.e. by one person), and the necessity of carrying such a device on the body or in the hand. Within a vehicle, for instance, it is not usually feasible to control the car radio using an infrared remote control. Free hands are usually required in industrial production environments, so control functions should be installed at fixed points.

Duplication of the control and display functions:

For the sake of convenience or to meet a requirement for control or display at a plurality of locations, the control and display functions can also be provided in multiple instances at a variety of locations. This could be, for example, a multiplicity of light switches which switch the same lamp or the same group of lamps, multiple instances of window raising switches or a fixed cabled HiFi remote control installed on a vehicle steering wheel, display elements at a plurality of locations in a production system, or also operating elements at different heights for disabled-friendly provision in an office or domestic environment. In order to realize this, however, suitable cabling or radio devices must be installed in each case. Moreover, these control and display functions are usually only realized in very limited numbers not only for cost reasons. Specifically, an ergonomic fine adjustment in the proximate area is typically not possible because, for example, ten instances of a particular switch element within reach of a vehicle steering wheel are not provided at different heights for visual reasons and for a clearer layout.

The problem to be solved may be generalized to state that control functions should be transferred to freely selectable positions within a two-dimensional multiplicity which may comprise a plurality of individual parts. Examples of such multiplicities are largish surfaces in the human environment such as floors, walls and ceilings in premises, the interior trim of vehicles, the surface of seats, instruments or even the facings of industrial production systems.

According to one embodiment of the invention, a processor arrangement is provided which has a plurality of processor units, each of which is connected to at least one adjacent processor unit, and each of which has one control element and at least one communications interface for providing a data communications link with an adjacent processor unit. The processor arrangement furthermore has a control computer which is connected to one of the processor units, and is configured to exchange information with the processor unit, and is furthermore configured to assign one control element of the plurality of control elements to a device that is electrically connected to the processor arrangement for the control thereof.

According to another embodiment of the invention, a processor arrangement has a plurality of processor units, which are electroconductively connected to one another and in each case has one control element and at least one communications interface for providing a data communications link with one of the adjacent processor units. The processor arrangement is connected to a control computer by means of one of the processor units so that information can be exchanged between the control computer and the processor unit, wherein the processor unit connected to the control computer forwards the information received from the control computer to the other processor units of the processor arrangement. The control computer is furthermore configured to assign one particular control element of the plurality of control elements to a device, such as a lamp, a machine or a complete production system for example, which is electrically connected to the processor arrangement so that the device is controlled by means of the assigned control element.

The processor unit network realized by the processor arrangement may be a fixed wired network in which each processor unit has a permanently specified unique address.

The device may be any device that can be controlled by means of electrical signals, with it also being possible to use an additional switch element, such as a transistor, a relay or the like for example, to control the device if the output current of the control computer is insufficient to actuate the device. The device to be controlled may be arranged externally to the processor arrangement and the control computer. In concrete terms, this means that the device to be controlled may also be physically separate by detaching the electrical wires from the control computer to the device. The device to be controlled may also be integrated in the processor arrangement, or in the control computer, for example as a light-emitting diode integrated on one of the processor units.

In general, it is thus achieved that the aforesaid device is controlled by means of a control element which control element can be freely selected from the plurality of control elements present in the processor units, in that signals received from the selected control element are forwarded to the device to be controlled. Since the assignment of the control element to the device may be realized by means of software in the control computer, the arrangement may be readily adapted to changing conditions and requirements.

When changing the assignment of a control element to the device, the user may gain the impression that the control element, for example the switch for switching on the electrical device, has been "shifted" from its customary first location to a second location, whereas in fact the assignment of the first control element at the first location has been cancelled and a second control element at a second location has been assigned to the device.

From the point of view of the control computer, on the one hand it receives signals from all control elements and processor units of the processor arrangement, and on the other hand outputs control signals to the device. In particular, the control computer is configured to output signals of a given control element as control signals to the device, while the signals of the other control elements are not forwarded to the device.

The control computer is, for example, a conventional PC, and may also be realized by any other control means that can be configured to receive the signals of the control elements, to forward the signal received from a given control element, and to output the signal of the given control element as a control signal to the device. Examples of such control means are microcontroller, ASIC and FPGA modules. ASIC stands for "Application Specific Integrated Circuit", and FPGA stands for "Field Programmable Gate Array", i.e. a freely programmable logic circuit.

According to one embodiment of the invention, the control computer of the processor arrangement has a memory for storing an address of one control element of the plurality of processor units, with the address uniquely identifying the control element, and the control computer is configured for controlling the device on the basis of information which is input by means of the control element to which the stored control element address corresponds.

For instance, the control element used for controlling the device can be assigned to the device by means of information set up in a memory of the control computer. One advantage of this exemplary embodiment is that the processor arrangement can be readily reconfigured so that another control element can be assigned to the device for the control thereof. The information is stored for instance in a non-volatile but alterable memory element, for example on a hard disk, in RAM memory, in Flash memory or in EEPROM, so that the information may be changed if necessary.

According to another embodiment, the control computer has an input unit for inputting the address of the control element.

According to another embodiment, the control computer has an input unit and a software application installed on the control computer which enables the address of the control element to be input. In this way the processor arrangement can always be readily adapted to changing conditions, especially when these conditions change frequently. In concrete terms, the control computer thus serves as a portal for inputting the address of the respective control element.

According to another embodiment of the invention, the control computer furthermore has a display unit. The control computer may have a display unit, such as a screen for example, so that a user of the processor arrangement can obtain an overview of the system and especially the current configuration at any time.

According to another embodiment of the invention, one control element of the plurality of processor units is configured for inputting the address of the control element.

With the aid of such a configuration of the processor arrangement, the user can input the address directly on the processor arrangement for example by means of tactile inputs, so that specific processor units or also regions of processor units fulfill defined functions which other processor units do not fulfill. The input address information is transmitted to the control computer and stored therein. In concrete terms, this exemplary embodiment enables a simple configuration of the processor arrangement in that the processor units used for control are selected simply by touching them, or existing switching areas on the textile element are "shifted".

For instance, a particular point on the interior trim of a vehicle may be configured so that when the point is touched the motor for the window pane is activated, while most of the remaining surface does not perform this. In this manner it is therefore possible to create any number of switches or displays on the entire networked area and transfer them to any locations. As a result, the networked surface becomes a kind of touchscreen on which displays and switching areas may be situated at any location.

According to another embodiment of the invention, at least one processor unit has an output element which is the device connected to the processor arrangement.

The device to be controlled may also be integrated as an output element in the processor arrangement, that is to say a processor unit. For instance, the output element may be a light-emitting diode integrated on at least one of the processor units. Such a embodiment of the invention makes it possible to switch on and off light-emitting diodes at any positions of the processor arrangement. The processor arrangement may also have a plurality of light-emitting diodes or an LCD display element, whose display can be controlled in this manner.

According to another embodiment of the invention, every processor unit has a plurality of control elements and/or output elements.

According to another embodiment, a plurality of control elements and/or output elements is arranged on each of the processor units. This enables a greater flexibility of the processor arrangement to be obtained. For instance, every processor unit can have light-emitting diodes with different colors and a switch element which are controlled depending on the actuation of the switch elements of the processor arrangement on the basis of the information stored in the control computer.

According to another embodiment of the invention, at least one of the output elements is configured as an actor that is one of the actor types light-emitting diode or sound generator, and at least one of the control elements is configured as a sensor that is one of the sensor types microphone, pressure sensor, temperature sensor or smoke sensor.

The processor unit can thus be configured for deployment in a multiplicity of application areas by integrating the respective actors required.

According to another embodiment of the invention, the plurality of processor units is configured to determine a distance of the respective processor unit from a reference position by means of exchanging messages with at least one other connected processor unit wherein a first message contains distance information which indicates the distance of a processor unit transmitting the first message, or the distance of a processor unit receiving the first message from the reference position.

A self-organizing network of processor units can thus be formed which forms the fundamental structure on which exemplary embodiments of the invention are based. It is a particular advantage of the self-organizing network that every time the network is initialized it is detected whether the processor units and the electrical connections between the processor units are functioning, and the processor arrangement is configured accordingly, in that alternative signal paths are automatically used which circumvent failed connections in order to interconnect all functioning processor units to form a processor arrangement. Every processor unit receives a corresponding address during initialization here.

According to another embodiment of the invention, the processor units are embedded in film, ceramics, paper or textile material.

The material to which the processor units are applied can also be adapted to the circumstances of a particular application. For instance, a plastic film is particularly suitable for applications having special mechanical requirements since the plastic film can be washed down with water. Ceramics are characterized in particular by high thermal, mechanical and chemical resistance, but they are relatively heavy and are difficult to adapt to uneven surfaces, for example curvy surfaces. Paper, such as paper wall coverings for example, is light and can also be affixed to uneven surfaces. A textile material such as carpet is particularly suitable for applications in houses and vehicles. In concrete terms, the networked surface, that is to say the film, carpet, tiled area or the textile fabric, becomes a kind of touchscreen on which displays and switching areas may be situated at any location.

According to another embodiment of the invention, the processor units are populated differently with actors and/or sensors.

In principle, this network or this group of networks is homogeneous, that is to say populated in the same way; but this does not preclude certain display elements or sensors from not being available everywhere, but only at specific processor units. In order to save costs, therefore, particularly expensive processor units need only be integrated at a few points in the processor arrangement.

According to another embodiment of the invention, the processor arrangement is configured as a floor covering, wall covering or ceiling covering.

Overall, therefore, an extensive flat sensor and/or display field is produced, which may be applied to or inserted into the abovementioned surfaces. In particular, for example, the interior trim of a vehicle may also comprise a plurality of such flat sensor and/or display fields, for instance made of a plurality of textile pieces. A plurality of such networks, that is to say planar elements, may be electrically interconnected and controlled by means of a common portal of the control computer. The interior trim of a car may thus comprise a plurality of planar elements, which simplifies the manufacture of such planar elements and makes them less expensive.

According to another embodiment of the invention, the processor arrangement may be arranged in premises, the interior trim of vehicles, surfaces of instruments or facings of industrial systems, which affords the processor arrangement a wide range of applications.

The aforesaid exemplary embodiments of the invention have the following fundamental principles:

1. Freely selectable locations for control or display functions within a, for instance, self-organizing fault-tolerant network of uniform processors which may be embedded in film, ceramics, textiles or other materials.

2. According to another embodiment, locations for control or display functions can be freely selectable within a group of, for instance, self-organizing fault-tolerant networks of uniform processors which are managed via a common central control unit (portal).

3. According to another embodiment, locations for control or display functions can be freely selectable within a, for instance, self-organizing fault-tolerant network of uniform processors which are populated with different sensor or display elements. The free selection of the locations may be restricted here to elements that can physically fulfill the desired function.

Exemplary embodiments of the invention enable control functions to be realized flexibly at variable locations so that it is possible to operate electrical devices using the control functions arranged at these locations. In other words, free transfer of control functions within networks is enabled.

According to another embodiment of the invention, a method is provided for controlling a device by means of a processor arrangement electrically connected to the device, wherein the processor arrangement has a plurality of processor units which are connected in each case to at least one adjacent processor unit and which have in each case one control element and at least one communications interface for providing a data communications link with an adjacent processor unit in each case, as well as a control computer which is connected to one of the processor units. The method comprises the exchange of information between the control computer and the processor unit connected to the control computer, as well as the assignment of one control element of the plurality of control elements to the device.

According to another embodiment of the invention, a method is provided for controlling a device by means of a processor arrangement electrically connected to the device, wherein the processor arrangement has a plurality of processor units which are connected in each case to at least one adjacent processor unit and which have in each case one control element and at least one communications interface for providing a data communications link with an adjacent processor unit in each case, and wherein the processor arrangement furthermore has a control computer which is connected to one of the processor units, the control computer having a memory for storing an address of one control element of the plurality of processor units, with the address uniquely identifying the control element. The method comprises the exchange of information between the control computer and the processor unit connected to the control computer, as well as the assignment of one control element of the plurality of control elements to the device for controlling the device, wherein the device is controlled on the basis of information which is input by means of the control element to which the stored control element address corresponds.

FIG. 1 shows an exemplary embodiment of the invention.

FIG. 1 represents by way of example how, in a configuration mode, a virtual switch present in a textile fabric can be transferred across the network and also beyond network boundaries by passing the hand over the textile fabric. Subsequent touching at the position of the virtual switch activates the associated function. It is dependent on the implementation whether the position of the switch is marked, by light-emitting diodes for example, or whether the switch is invisible to the eye.

In this way the desired control function can be defined at any point within the network or the connected group of networks. Depending on preference and necessity, the functions may also be present in any number, for example a plurality of identical light switches at specific but freely selectable points on a textile electronic wallpaper of a living room. In particular the points may also be largely defined in the proximity of a user, for example shifting of the fuel indicator by a few centimeters in a vehicle depending on the size of the driver, with the resolution depending on the distance of the processor units or the connected sensors and actors respectively. Another example is a child-lock which grows in line with requirements, for instance blocking all functions for toddlers, blocking the door opener for adolescents, but releasing air conditioning and window raising at positions suitable for children. Since the control and display function is configured electronically and can be stored as a profile in the control computer, once a configuration has been defined it can be readily reproduced again. For instance, it is possible to store a separate profile for every vehicle driver so that all displays, switches and sensors can be set up for him in a few moments. Another example is changing a workpiece to be produced on a production system for which the control functions are passed to the appropriate points for the controller. Since the network is self-organizing and extremely fault-tolerant, assembly is easy and operating reliability is high, as simple failures or cable breaks do not adversely affect operation.

According to FIG. 1, the processor arrangement 1 has a planar element 10 or a plurality of mutually independent planar elements 10 and a control computer 3 which is connected to each of the planar elements 10. Textile materials, tiles or films may be used as planar elements 10. For example, illuminated symbols 11 can be displayed at different positions of the planar elements 10 which indicate to the user the position of a switch element. A symbolic hand may be displayed as the illumination symbol 11 for example, and in particular a plurality of different illumination symbols 11 may be displayed on the planar elements 10, which symbols accordingly indicate a plurality of switch elements.

The illumination symbols 11, or more generally the display elements, and the sensor elements, that is to say the input elements, are connected to the control computer 3 by means of a connection line 12 so that they form a self-organizing network for example, and exchange messages therewith. Connection lines 12 comprise electroconductive lines that are suitable for transmitting the supply voltage and the information and signals exchanged between the various components of the network. In a textile planar element, for example, electroconductive threads can be used.

The control computer 3 is also connected, for example, to an external appliance or external device. Examples of such appliances and devices 4 are a lamp, a motor or a complete production system. It is thus possible to control external appliances 4 by inputting instructions by means of the input elements of the planar element 10 and to display information on the planar element 10.

A switch element is assigned in each case to the respective illumination symbol 11 displayed so that a device 4 connected to the control computer 3 can be actuated by pressing the illumination symbol 11.

The control computer 3 is furthermore configured to display the illumination symbols 11 at different positions of the planar elements 10 if the configuration of the processor arrangement 1 is changed. For example, as shown in FIG. 1, the first illumination symbol 11 on the first planar element 10 can be displayed, later the second illumination symbol 11 on the first planar element 10 and then the third illumination symbol 11 on the first planar element 10. According to one embodiment of the invention, when one illumination symbol 11 is displayed, the respective previously displayed illumination symbol is no longer displayed so that a user looking at the planar element 10 gains the impression that the illumination symbol 11 jumps from one position to the next.

In all cases, however, it remains ensured that the motor 4 can be actuated by pressing the respective illumination symbol 11 displayed.

This sequential display sequence is represented in FIG. 1 in that only the outline is displayed of illumination symbols 11 that are no longer illuminated, while an illumination symbol 11 that is illuminated is represented as filled in. Since each of the planar elements 10 is connected to the control computer 3, this "movement" of the illumination symbols 11 is not limited to one planar element 10, but can be continued, as represented in FIG. 1, on a second planar element 10. For example, following the third illumination symbol 11 on the first planar element 10, the single illumination symbol 11 on the second planar element 10 is displayed, and then the first illumination symbol 11 on a third planar element 10 and then the second illumination symbol 11 on the third planar element 10. The second illumination symbol 11 on the third planar element 10 is illuminated for as long as is required and in FIG. 1 is represented as filled in. The fact that a plurality of planar elements 10 may be connected to the control computer 3 and thus act as a single planar element 10 has the particular advantage that it is possible to arrange a single planar element 10 on different surfaces in each case, with all planar elements being controllable as a single entity by the control computer 3.

In particular, an illumination symbol 11 displayed on the planar elements 10, which indicates the position of a switch element for example, can be realized by means of light-emitting diodes. Alternatively, it is also possible for display elements that are suitable for displaying information, for example the operating status (ON, OFF, MALFUNCTION) of the motor 4, to be arranged on the planar elements 10. The switch element, which is a sensor, can be realized as a microphone, a pressure sensor, a temperature sensor or a smoke sensor, so that the motor 4 is activated on the basis of a detected sound level, pressure signal, temperature signal or a combustion gas concentration.

If pressure sensors are used as input elements, during initialization mode a display element can be shifted from a first position to a second position by swiping a hand over the pressure sensors, which metaphorically corresponds to the so-called "drag and drop" principle. For this, the control computer 3 follows the track of the swiping action, in that the addresses of pressure sensors in the processor arrangement 1 which detect an applied pressure are registered, so that the display element represented at the position at which an applied pressure is first detected is displayed at the respective positions at which contact is subsequently detected. If no further movement is detected, the assignment of the first pressure sensor at the first location to the motor 4 is cancelled and a second pressure sensor at a second location corresponding to the last registered position, that is to say the endpoint of the swiping action, is used to actuate the motor 4.

Put more precisely, in each case a position of a first pressure sensor which detects an applied pressure is read out, and it is determined which first sensor element at or in the vicinity of this position is displayed. A second position of a second pressure sensor which subsequently detects an applied pressure is then read out, and the position is determined of the closest identical second display or sensor element situated at or in the vicinity of the second position.

In operator mode the control computer 3 then outputs information that was originally output based on the actuation of the first pressure sensor, based on the actuation of the second pressure sensor, whereas in general an actuation of the first pressure sensor is now ignored. This means that the user can switch the motor 4 on and off by pressing on the planar element 10 at the position of the second pressure sensor, while pressing at the position of the first pressure sensor no longer has any effect.

Alternatively, the control computer 3 may have an input device, such as a mouse or a keyboard for example, so that the positions of display and sensor elements can be set up directly on the control computer 3. The control computer 3 has a suitable control program for this purpose.

In particular, the processor arrangement 1 may be arranged with such a planar element 10 or a plurality of such planar elements, on a large machinery plant in industry, and a control console for the machinery plant may be formed by means of the display and input elements. It is then particularly advantageous that the control console can be represented on every surface of the machinery plant, so that a user of the machinery plant can control it from the position most favorable for him. Alternatively, only especially important operating elements (e.g. ON, OFF, EMERGENCY STOP, increase rate, decrease rate) may be represented on the most favorable surfaces for the user in each case.

Such a planar element 10 may also be arranged on a vehicle surface, for example in a car, so that the driver of the car can tailor the position of operating elements precisely to his requirements, for example to the size of his body.

Furthermore, such a planar element 10 may also be secured on the ceiling of a passenger aircraft for example, and have operating elements for passengers, such as light on/off or a call button. This exemplary embodiment has the advantage that whenever new seating is installed in the passenger cabin, using the control computer it is possible to select the processor units of the plurality of processor units that correspond to the new seating for realizing the switch function, so that every passenger can easily reach the operating elements from their seat.

Figure 2:
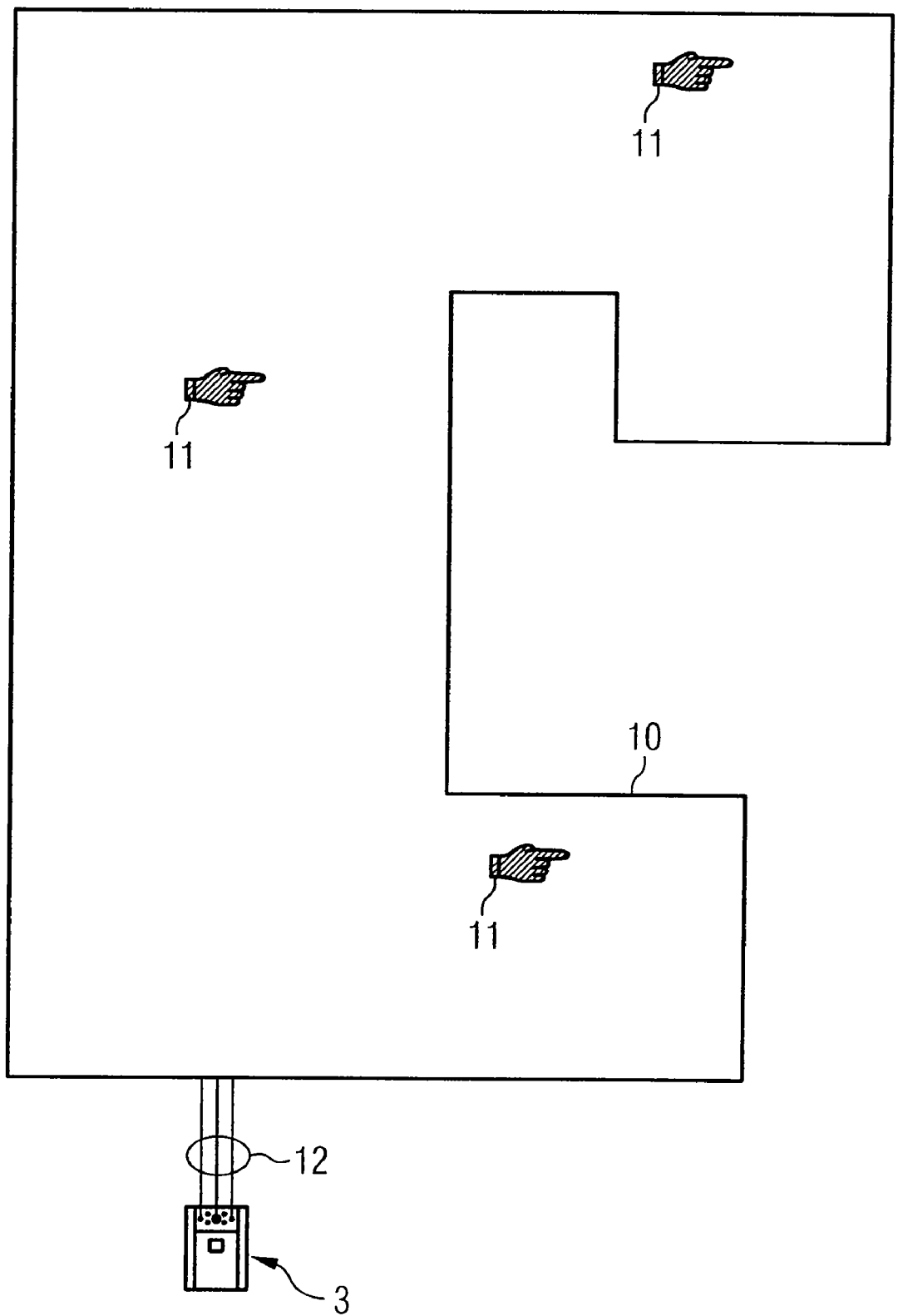
FIG. 2 shows a planar element with input elements according to an exemplary embodiment of the invention.

FIG. 2 shows a planar element with input elements according to an exemplary embodiment of the invention.

In the following exemplary embodiment, sensor elements and display elements are controlled so that virtual switches 11, which correspond to the above-mentioned illumination symbols, are defined within the self-organizing network. In particular, FIG. 2 shows for example an irregularly shaped planar element 10, e.g. a textile fabric or an irregular film, on which three areas are highlighted, so that a user can see the positions of the control elements. To highlight the three areas, the planar element 10 may be equipped for example with a network arranged in a textile fabric and light-emitting diodes which allow a spot of light to shine through the textile fabric, which indicates the location of the control elements to the user. As already illustrated, the positions can be set up by means of hand movements over the planar element 10.

If one of the three virtual switching areas 11 is now touched with the hand, a sensor message is transmitted from the virtual switching area 11 to the control computer 3, that is to say the central control unit, which is represented in the lower part of FIG. 2 and is electroconductively connected to the switching areas by means of connection lines 12. Depending on the application, the desired function can then be triggered from there, for instance the movement of the window pane in a vehicle. The networked planar element 10 may have any sectional form here. In addition, the planar element 10 may have curvatures to the extent that they are technically possible, for example by fitting an electronic textile into a curved vehicle frame in order to form the interior trim.

Figure 3:
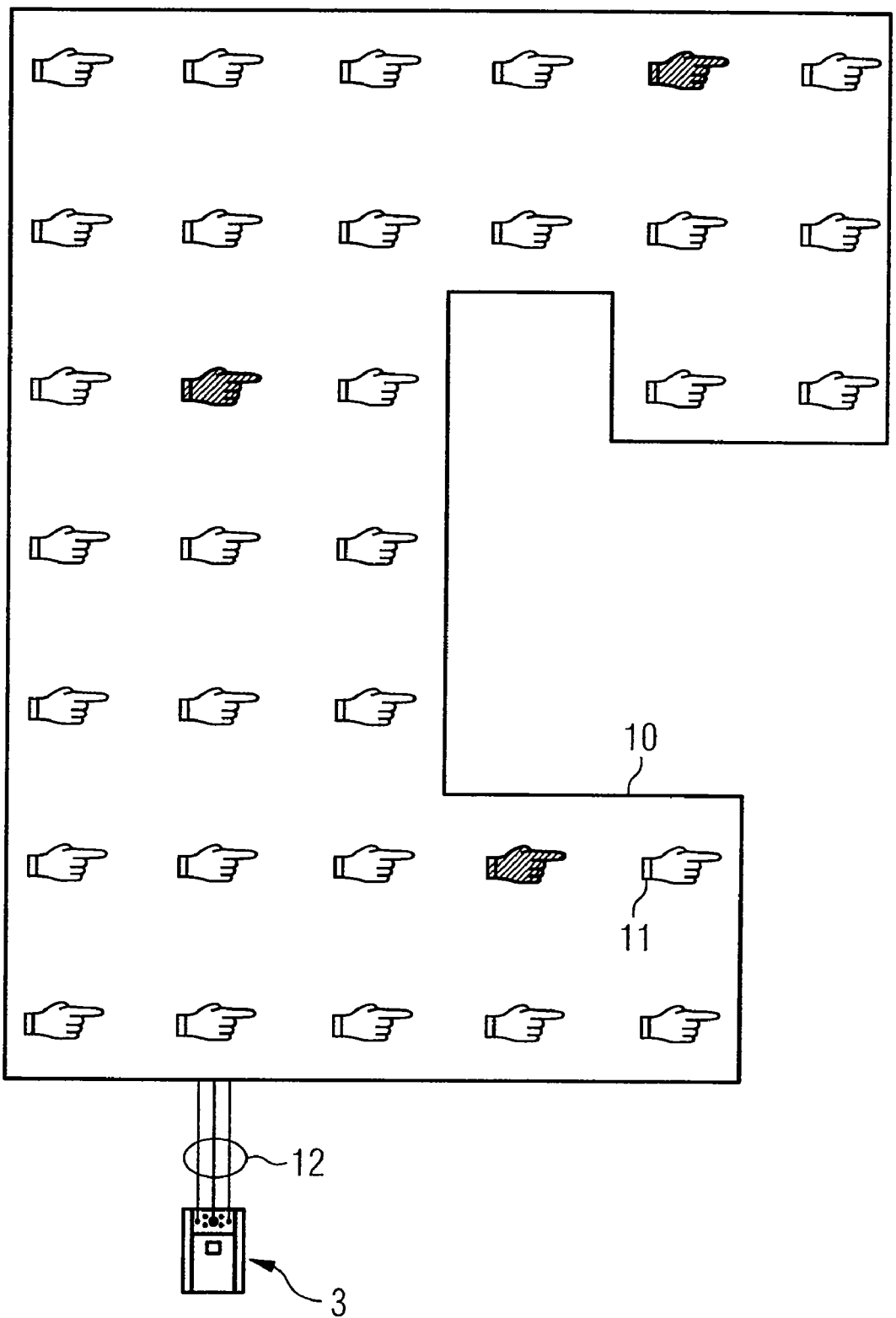
FIG. 3 represents possible locations for transferable switches on a textile surface.

FIG. 3 represents possible locations for transferable switches on the textile planar element.

In FIG. 3 all possible locations for transferable switches 11, that is to say virtual switching areas, are represented, with the textile planar element 10 corresponding to the planar element represented in FIG. 2. Also represented in FIG. 3 is a control computer 3 which is connected to the textile planar element 10 by means of connection lines 12. Representation of the device to be controlled which is connected to the control computer 3 was omitted in FIG. 3.

As can be seen therefrom, the control elements 11, that is to say the virtual switches, can be represented at a multiplicity of positions, with active control elements being represented by a filled hand, while inactive control elements are represented by an outlined symbolic hand. The distances between two adjacent control elements 11 is determined by the distance of the two processor units (not represented) on which the two control elements are arranged in each case.

Figure 4:
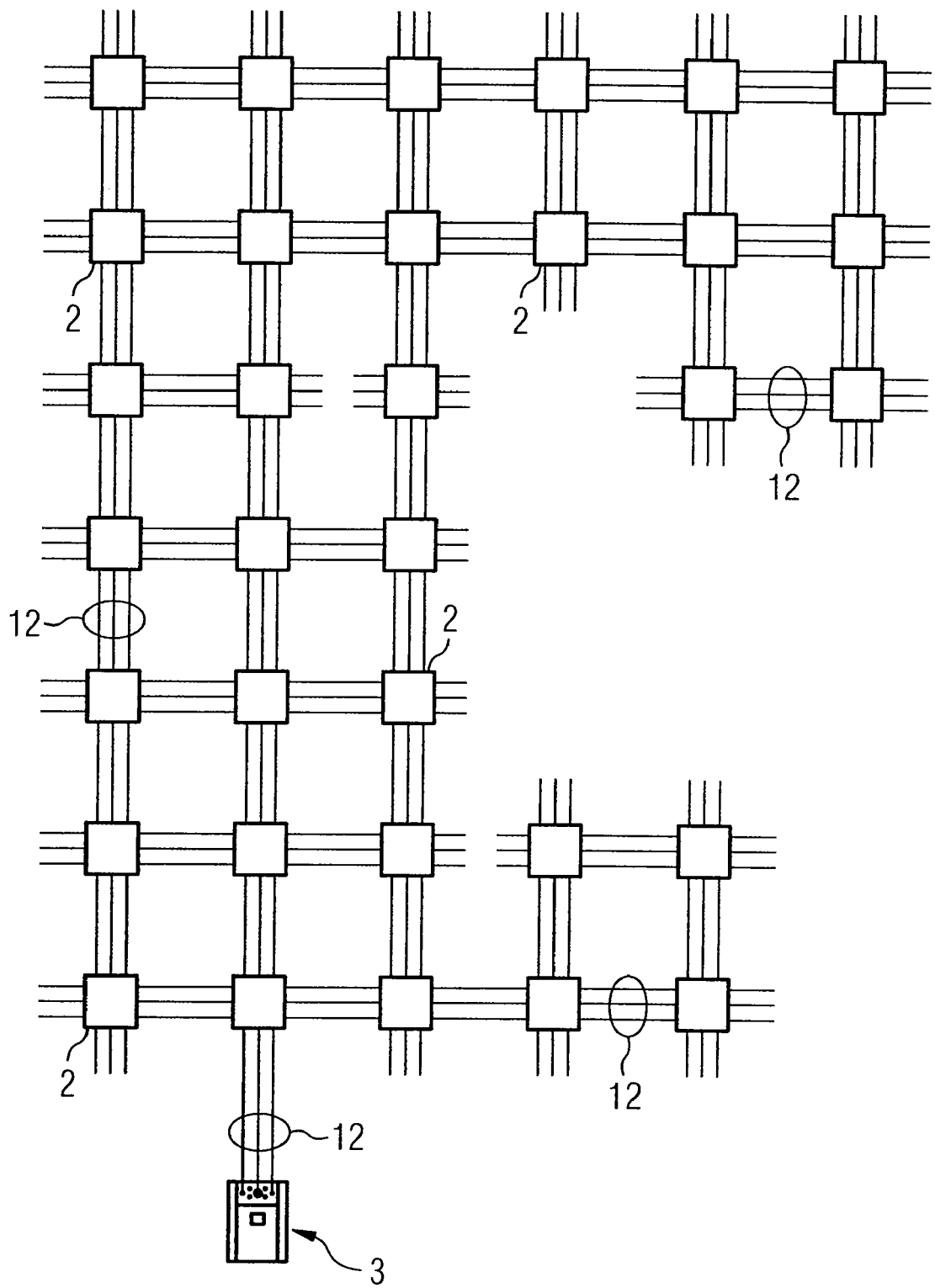
FIG. 4 shows an arrangement of interconnected processor units.

FIG. 4 represents an arrangement of interconnected processor units.

FIG. 4 shows a further representation of the planar element already represented in FIGS. 2 and 3. In particular FIG. 4 shows the processor units 2 that are arranged in the planar element and the control computer 3 for controlling the processor arrangement. To simplify the drawing, representation of the device which is connected to the control computer 3 was likewise omitted in FIG. 4.

The processor units 2 are generally electroconductively connected to the respective adjacent processor units 2. For electroconductive connection, conductive threads which are woven into the textile material are used in textile materials for example. Two adjacent processor units 2 are connected by means of a plurality of electroconductive connection lines 12, the number of which depends on the requirements for the processor units 2. According to FIG. 4, two adjacent processor units 2 are connected by three connection lines 12 in each case. It may however occur that the connection between two adjacent processor units 2 is faulty.

Faulty, that is to say broken, connection lines are therefore also represented in FIG. 4. These cases are represented in FIG. 4 in that all three connection lines 12 represented between the two adjacent processor units 2 are broken, although in reality in most cases only a single connection line 12 is broken. Owing to the principle of fault-tolerant self-organization, however, the network operates just as fault-tolerantly as in FIG. 3 as perceived by the user, as long as every processor unit 2 can establish a connection for data communication to the control computer 3 by means of at least one electroconductive connection line 12.

The control computer 3 is electroconductively connected to one of the processor units 2.

Figure 5:
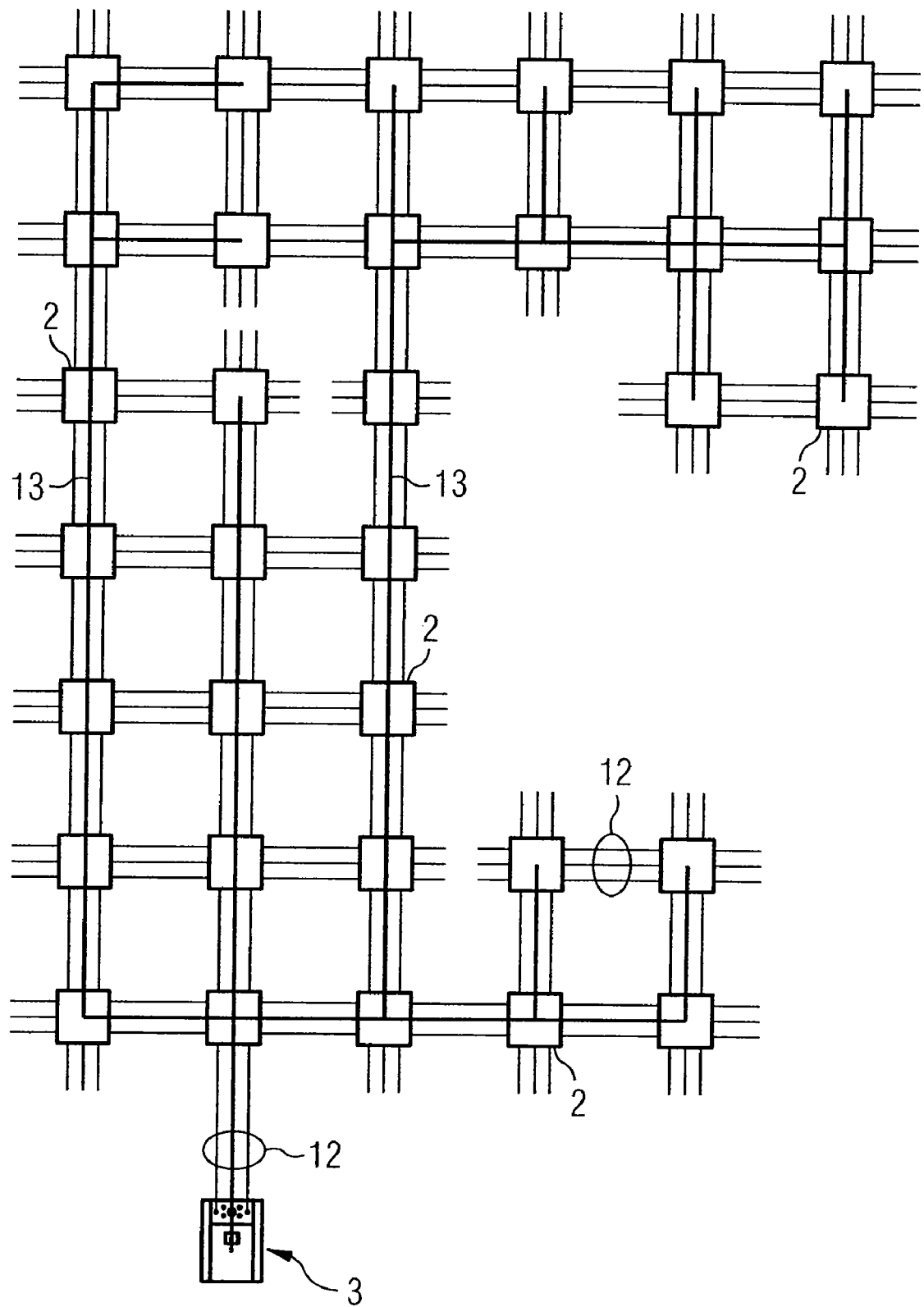
FIG. 5 shows the underlying network of processor units.

FIG. 5 shows the underlying network of processor units.

FIG. 5 shows the same planar element that was already seen in FIGS. 2 to 4, with each display element shown in FIG. 3 corresponding to one of the processor units 2 shown in FIG. 5. In particular the bold line in FIG. 5 also indicates the data signal path 13 between the control computer 3 and each individual one of the plurality of processor units 2. To operate the processor arrangement, it is sufficient for one electroconductive connection for data communication to exist between every processor unit 2 and the control computer 3. Each of the processor units 2 need not however be connected to its adjacent processor units.

To establish an electroconductive signal connection, that is to say a data communications link, between a processor unit 2 and one of the adjacent processor units, every processor unit 2 has at least one bidirectional communications interface (not represented) so that information can be exchanged with the adjacent processor unit. In particular, every processor unit 2 is additionally configured for forwarding the information between two other processor units which are adjacent to the processor 2 in each case and which have a data communications link between themselves and the processor unit 2. It is thus possible to transmit information from the control computer 3 to each of the plurality of processor units 2, for example if the processor unit 2 has an actor which corresponds to the device to be controlled and which is connected to the control computer 3. In other words, the device 4 which is controlled by means of the control computer 3 can be arranged on one of the plurality of processor units 2 of the processor arrangement 1. For example, a first processor unit of the processor units 2 may have a light-emitting diode which is controlled by means of a pressure sensor of a second processor unit of the plurality of processor units 2, with the first and the second processor unit being different processor units 2. Information, for example control signals for controlling a device, can furthermore be forwarded to the control computer 3.

One switch location per processor unit 2 is represented in this exemplary embodiment. In other exemplary embodiments, however, it is also possible to control a plurality of sensors and/or actors per processor unit 2, that is to say the position network represented in FIG. 3 would be denser, or it is also possible to equip only a selection of processor units 2 with one sensor and/or one display, that is to say the network represented in FIG. 3 would be less dense or would exhibit gaps.

In other words, FIG. 5 shows an example for an automatically generated routing tree via which it is possible to address every processor unit 2, and which branches, metaphorically speaking, outward from the root corresponding to the control computer 3 to each individual one of the plurality of processor units 2.

FIG. 6 shows a processor unit and the control computer in detail.

FIG. 6 shows a part of the processor arrangement having one processor unit 2 of the plurality of processor units forming the processor arrangement, and the control computer 3 which is electroconductively connected to the processor unit 2 shown by means of a connection line 12, as well as a motor 4 which is connected to the processor arrangement, that is to say to the control computer 3.

The processor unit 2 has a plurality of communications interfaces 20 with which in each case a data communications link can be established to each of the adjacent processor units, not represented here, and to the control computer 3. The data communications link is realized by means of conductive threads which may be woven into the textile planar element. The processor unit 2 furthermore has a microprocessor 21, a pressure sensor 22 and a light-emitting diode 23. By means of the communications interfaces 20, the microprocessor 21 is configured to receive data from the adjacent processor units and to forward it to the control computer 3. Furthermore, the data which is registered by means of the pressure sensor 22 is forwarded to the control computer 3. The processor unit 2 is also configured for forwarding the data from the control computer 3 to the adjacent processor units. The pressure sensor 22 and the light-emitting diode 23 serve for example as sensor or actor for inputting and outputting data. Apart from the pressure sensor 22 and the light-emitting diode 23, the processor unit 2 can have a microphone, a temperature sensor or a smoke sensor, or a sound generator respectively.

The control computer 3 has input/output ports 30 for establishing a data link to the processor unit 2 and to the motor 4, a processor 31 with a non-volatile memory 32, a display device 33 and an input device.

The processor 31 is configured to receive detected data from processor units 2 and to assign a control element, such as the pressure sensor 22 for example, to the motor 4 for the control thereof. The memory 32 is non-volatile but is rewritable, and contains as information an address of a control element 22, with the address uniquely identifying the particular control element 22 being used to control the motor 4. In other words, the processor 31 is configured to receive the data which is detected by all control elements of the plurality of processor units 2, with the motor 4 being controlled on the basis of the data detected by the particular control element having the address stored in the memory 32. Since the address is stored in a rewritable memory 32, the address can be changed in a simple manner, which means that another control element is then used to control the motor 4.

The control computer 3 furthermore has an input device, for example a mouse 35 and/or a keyboard 34, for inputting the address of the control element which is then stored in the memory 32. It is also possible to connect a display device 33 such as an LCD display to the control computer 3 for displaying the current configuration of the processor arrangement.

The control computer 3 is, for example, a conventional PC, and may also be realized by any other control circuit that can be configured to receive the signals of the control elements, to forward the signal received from a given control element, and to output the signal of the given control element as a control signal to the motor 4. Examples of such control circuits are microcontroller, ASIC and FPGA modules. ASIC stands here for "Application Specific Integrated Circuit", and FPGA stands for "Field Programmable Gate Array", i.e. a freely programmable logic circuit. The motor 4 is not described here in greater detail and can be assumed to be a conventional electric motor, wherein the motor 4 stands only as an example for all electrically controllable devices, such as a lamp, a production system, etc. for example, which can be controlled by means of the processor arrangement.

Although exemplary embodiments of the present invention and their advantages have been described in detail, it should be understood that various changes, substitutions and alterations can be applied hereto without departing from the spirit and scope of the invention as defined by the appended claims. For example, it will be readily understood by those skilled in the art that many of the features, functions, processes and materials described herein may be varied while remaining within the scope of the present invention. Moreover, it is not intended to limit the scope of the present invention to the specific embodiments of the features, functions, process, means, method or steps mentioned in the description. As the average person skilled in the art will readily appreciated from the disclosure of the present invention, according to the present invention it is also possible to use features, functions, processes, means, methods or steps which already exist or will be developed in future and which essentially fulfill the same object or essentially obtain the same result as the respective embodiments described herein. Accordingly, it is intended that the appended claims include such features, functions, processes, means, methods or steps within their scope.

What is claimed is:

1. A processor arrangement, comprising:
   a plurality of processor units, each of which is connected to at least one adjacent processor unit, and each of which comprises one control element and at least one communications interface configured to provide a data communications link with an adjacent processor unit; and
   a control computer, which is connected to one of the plurality of processor units, and which is configured to exchange information with the one processor unit, and to further assign to a device that is electrically connected to the processor arrangement, one control element of the plurality of control elements for the control of the device,
   wherein the control computer comprises a memory configured to store an address that uniquely identifies the one control element, and the control computer controls the device based on information which is received from the one control element to which the stored control element address corresponds.

2. The processor arrangement as claimed in claim 1, wherein the control computer comprises an input unit configured to input the address of the one control element.

3. The processor arrangement as claimed in claim 2, wherein the control computer further comprises a display unit.

4. The processor arrangement as claimed in claim 1, wherein one control element of the plurality of processor units inputs the address of the one control element.

5. A processor arrangement, comprising:
   a plurality of processor units, each of which is connected to at least one adjacent processor unit, and each of which comprises one control element and at least one communications interface configured to provide a data communications link with an adjacent processor unit; and
   a control computer, which is connected to one of the plurality of processor units, and which is configured to exchange information with the one processor unit, and to further assign to a device that is electrically connected to the processor arrangement, one control element of the plurality of control elements for the control of the device,
   wherein at least one processor unit comprises an output element being the device connected to the processor arrangement.

6. The processor arrangement as claimed in claim 5, wherein each processor unit comprises a plurality of control elements or output elements.

7. The processor arrangement as claimed in claim 5, wherein each processor unit comprises a plurality of control elements and output elements.

8. The processor arrangement as claimed in claim 6, wherein at least one of the output elements is a light-emitting diode or a sound generator.

9. The processor arrangement as claimed in claim 5, wherein at least one of the control elements is a sensor of the type selected from the group consisting of a microphone, a pressure sensor, a temperature sensor, and a smoke sensor.

10. A processor arrangement, comprising:
    a plurality of processor units, each of which is connected to at least one adjacent processor unit, and each of which comprises one control element and at least one communications interface configured to provide a data communications link with an adjacent processor unit; and
    a control computer, which is connected to one of the plurality of processor units, and which is configured to exchange information with the one processor unit, and to further assign to a device that is electrically connected to the processor arrangement, one control element of the plurality of control elements for the control of the device,
    wherein each of the plurality of processor units is configured to determine a distance of the respective processor unit from a reference position by exchanging messages with at least one other connected processor unit, and wherein a first message comprises distance information which indicates the distance of a processor unit transmitting the first message, or the distance of a processor unit receiving the first message from the reference position.

11. The processor arrangement as claimed in claim 5, wherein the processor units are embedded in film, ceramics, paper, or textile material.

12. The processor arrangement as claimed in claim 5, wherein the processor units are populated differently with actors or sensors.

13. The processor arrangement as claimed in claim 5, wherein the processor units are populated differently with actors and sensors.

14. The processor arrangement as claimed in claim 5, being a floor covering, wall covering, or ceiling covering.

15. The processor arrangement as claimed in claim 5, arranged in premises, interior trim of vehicles, surfaces of instruments, or facings of industrial systems.

16. A method for controlling a device by means of a processor arrangement electrically connected to the device, the processor arrangement including a plurality of processor units, each of which is connected to at least one adjacent processor unit, and has one control element and at least one communications interface for providing a data communications link with an adjacent processor unit, and a control computer connected to one of the processor units, the method comprising:
    exchanging information between the control computer and the processor unit connected to the control computer;

assigning one control element of the plurality of control elements to the device;

storing an address that uniquely identifies the one control element; and controlling the device based on information which is received from the one control element to which the stored control element address corresponds.

17. A method for controlling a device by means of a processor arrangement electrically connected to the device, the processor arrangement including a plurality of processor units, each of which is connected to at least one adjacent processor unit and has one control element and at least one communications interface for providing a data communications link with an adjacent processor unit, and a control computer connected to one of the processor units, the control computer including a memory for storing an address of one control element of the plurality of processor units, with the address uniquely identifying the control element, the method comprising:

exchanging information between the control computer and the processor unit connected to the control computer; and assigning one control element of the plurality of control elements to the device, the device being controlled based on information which is input by means of the control element to which the stored control element address corresponds.

18. A processor arrangement, comprising:

a plurality of processor means, each of which is connected to at least one adjacent processor means, and each of which comprises one control element and at least one communications interface for providing a data communications link with an adjacent processor means;

a control computing means, which is connected to one of the processor means, for exchanging information with the one processor means, and for assigning to a device that is electrically connected to the processor arrangement, one control element of the plurality of control elements for the control of the device; and electronic storage means, which is connected to the control computing means, for storing an address that uniquely identifies the one control element, wherein the control computing means controls the device based on information which is received from the one control element to which the stored control element address corresponds.

19. A method for controlling a device by means of a processor arrangement electrically connected to the device, the processor arrangement including a plurality of processor units, each of which is connected to at least one adjacent processor unit, and has one control element and at least one communications interface for providing a data communications link with an adjacent processor unit, and a control computer connected to one of the processor units, the method comprising:

exchanging information between the control computer and the processor unit connected to the control computer;

assigning one control element of the plurality of control elements to the device; and determining a respective distance, by each of the respective processor units, from a reference position by exchanging messages with at least one other connected processor unit, wherein a first message comprises distance information which indicates the distance of a processor unit transmitting the first message, or the distance of a processor unit receiving the first message from the reference position.

20. A processor arrangement, comprising:

a plurality of processor means, each of which is connected to at least one adjacent processor means, and each of which comprises one control element and at least one communications interface for providing a data communications link with an adjacent processor means; and a control computing means, which is connected to one of the processor means, for exchanging information with the one processor means, and for assigning to a device that is electrically connected to the processor arrangement, one control element of the plurality of control elements for the control of the device, wherein each of the processor means has a determining means for determining a respective distance from a reference position by exchanging messages with at least one other connected processor means, and wherein a first message comprises distance information which indicates the distance of a processor means transmitting the first message, or the distance of a processor means receiving the first message from the reference position.

* * * * *